United States Patent
Fricker

(10) Patent No.: US 9,431,168 B2
(45) Date of Patent: Aug. 30, 2016

(54) CONTACTLESS INTERCONNECT

(75) Inventor: Jean-Philippe Fricker, Mountain View, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1114 days.

(21) Appl. No.: 13/495,325

(22) Filed: Jun. 13, 2012

(65) Prior Publication Data

US 2013/0334890 A1    Dec. 19, 2013

(51) Int. Cl.
*H01F 38/00* (2006.01)
*H01F 38/14* (2006.01)
*H04B 5/00* (2006.01)

(52) U.S. Cl.
CPC ......... *H01F 38/14* (2013.01); *H01F 2038/143* (2013.01); *H04B 5/0012* (2013.01); *H04B 5/0075* (2013.01)

(58) Field of Classification Search
CPC ... H02J 17/00; H04B 5/0012; H04B 5/0075; H01F 2038/143
USPC ......................................................... 307/104
See application file for complete search history.

(56) References Cited

U.S. PATENT DOCUMENTS

| | | | |
|---|---|---|---|
| 3,146,413 A * | 8/1964 | Butler | H01P 1/184 333/115 |
| 3,863,024 A * | 1/1975 | Caragliano | H04L 25/03127 333/109 |
| 3,979,699 A * | 9/1976 | Caragliano | H04B 3/02 333/116 |
| 4,376,921 A | 3/1983 | Dickens et al. | |
| 4,503,484 A | 3/1985 | Moxon | |
| 4,509,810 A | 4/1985 | Erlam et al. | |
| 4,763,340 A | 8/1988 | Yoneda et al. | |
| 5,012,321 A | 4/1991 | Magarshack | |
| 5,073,761 A | 12/1991 | Waterman et al. | |
| 5,168,242 A | 12/1992 | Willems et al. | |
| 5,571,256 A | 11/1996 | Good et al. | |
| 5,701,037 A | 12/1997 | Weber et al. | |
| 5,729,180 A * | 3/1998 | Brown | G01F 1/667 331/17 |
| 5,786,979 A | 7/1998 | Douglass | |
| 5,847,447 A | 12/1998 | Rozin et al. | |
| 5,977,631 A | 11/1999 | Notani | |
| 6,049,463 A | 4/2000 | O'Malley et al. | |
| 6,052,281 A | 4/2000 | Hardt et al. | |
| 6,612,852 B1 | 9/2003 | Panella | |
| 6,704,199 B2 | 3/2004 | Wiley | |
| 6,741,466 B1 | 5/2004 | Lebo | |
| 6,760,220 B2 | 7/2004 | Canter et al. | |
| 7,224,588 B2 | 5/2007 | Nieman et al. | |
| 7,688,593 B2 | 3/2010 | Byers et al. | |

(Continued)

*Primary Examiner* — Jared Fureman
*Assistant Examiner* — Emmanuel R Dominique

(57) ABSTRACT

A contactless connector requires no physical contact. A terminated transmitting transmission line on a first board is parallel to a dual-terminated receiving transmission line on a second board. The boards are placed face-to-face with a small air gap in-between. A driver drives a driven pulse onto a first end of the transmitting transmission line. The driven pulse capacitively induces a positive induced pulse on the first end of the receiving transmission line. As the driven pulse travels from the first end to the second end of the transmitting transmission line, energy is transferred to the induced pulse, which travels down the receiving transmission line. Inductive coupling becomes stronger than capacitive as the length increases, so that at the second end, the induced pulse is negative and then swings positive. A Schmitt trigger receiver on the second end of the receiving transmission line detects the signal.

13 Claims, 8 Drawing Sheets

(56) References Cited

U.S. PATENT DOCUMENTS

| | | | | |
|---|---|---|---|---|
| 8,613,395 | B2* | 12/2013 | Kimura | G06K 19/07767 235/492 |
| 8,878,739 | B2* | 11/2014 | Dokai | H01Q 9/06 343/748 |
| 9,001,001 | B2* | 4/2015 | Nakano | G06K 7/10009 343/866 |
| 2001/0041548 | A1* | 11/2001 | Bult | H03F 3/195 455/252.1 |
| 2002/0123251 | A1* | 9/2002 | Yatskov | H01R 12/714 439/65 |
| 2003/0117227 | A1* | 6/2003 | Escalera | H01P 5/10 333/26 |
| 2005/0047098 | A1 | 3/2005 | Garnett et al. | |
| 2005/0110700 | A1* | 5/2005 | Terry | G06K 19/0723 343/841 |
| 2007/0086175 | A1 | 4/2007 | Davis et al. | |
| 2007/0274198 | A1* | 11/2007 | Kuroda | H01L 23/48 370/201 |
| 2008/0048796 | A1 | 2/2008 | Shaul et al. | |
| 2008/0122489 | A1 | 5/2008 | Hailey | |
| 2008/0169564 | A1* | 7/2008 | Kim | H05K 1/0219 257/758 |
| 2008/0310097 | A1 | 12/2008 | Sherrod et al. | |
| 2008/0315978 | A1* | 12/2008 | Knight | G01R 31/3025 333/24 C |
| 2009/0057039 | A1* | 3/2009 | Kuroda | H04B 5/0012 178/43 |
| 2009/0227153 | A1 | 9/2009 | Zaderej et al. | |
| 2010/0081298 | A1 | 4/2010 | Hamner et al. | |
| 2013/0183898 | A1* | 7/2013 | Strid | H04B 5/0037 455/41.1 |

\* cited by examiner

CONTACTLESS INTERCONNECT

FIELD OF THE INVENTION

This invention relates to electronic interconnect, and more particularly to contactless interconnect.

BACKGROUND OF THE INVENTION

Electronic systems often have many integrated circuits (IC's) mounted onto printed-circuit board (PCB's) that connect to other PCB's. The IC's typically have metal contact pads, pins, or balls that are soldered to metal pads on the PCB. The PCB may also have pads or contacts that mate with a connector or socket mounted to another PCB or to a backplane in a chassis. This type of interconnect features contacts that make a physical and electrical connection.

However, at very high data rates the performance of the physical interconnect is affected by the materials surrounding the electrical contact as well as the geometries of the contacts themselves, which can both limit the usable frequency band for signals across the connector. Such a physical interconnect often behaves like a low pass filter, with some resonant frequencies resulting from the contact geometries that approach the dimensions of the wavelength of the signal.

Interconnects that do not have a physical, direct contact are also used. Such contactless interconnects include radio-frequency (RF) signals that are modulated and transmitted by an antenna, to be received by another antenna. However, RF modulation, transmission, and reception is quite complex and costly. Wideband couplers are also used with RF equipment to split signals of different frequencies from different sources. However, wideband couplers tend to be on a single substrate, which prevents removal and replacement of circuit boards in a system.

FIG. 1 shows a capacitive coupler interconnect. A signal on chip 18 is driven by buffer 10 onto pad 14, which does not make physical contact with pad 16 on chip 20. Instead, pads 14, 16 are separated by a thin air gap 22. If air gap 22 is sufficiently thin, relative to the areas of pads 14, 16, air gap 22 acts as a dielectric in a capacitor, with pads 14, 16 acting as the plates of the capacitor.

The signal driven onto pad 14 by buffer 10 is capacitively coupled across air gap 22 to create a signal on pad 16. The signal on pad 16 can be amplified by receiver 12 to be used by other circuitry on chip 20.

The signal coupled to pad 16 has the same polarity as the signal on pad 14, but its amplitude is smaller due to parasitic losses. Other parasitic capacitances on the node between pad 16 and amplifier 12 cause charge sharing that reduces the amplitude of the coupled signal. Differential signaling may be used to increase the signal-to-noise ratio and thus compensate for the signal attenuation.

The performance of such capacitive couplers depends on the thickness and type of the dielectric between pads 14, 16 which includes air gap 22 and perhaps some dielectric layers above pads 14, 16, or even a gel or other paste placed in air gap 22. Variations in the dielectric thickness can significantly alter the interconnect performance. The thickness of air gap 22 must be extremely small to produce a significant capacitance. Achieving a small and controlled thickness is challenging, especially for interconnect between PCB's.

What is desired is an improved contactless interconnect.

DETAILED DESCRIPTION

The present invention relates to an improvement in contactless interconnect. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
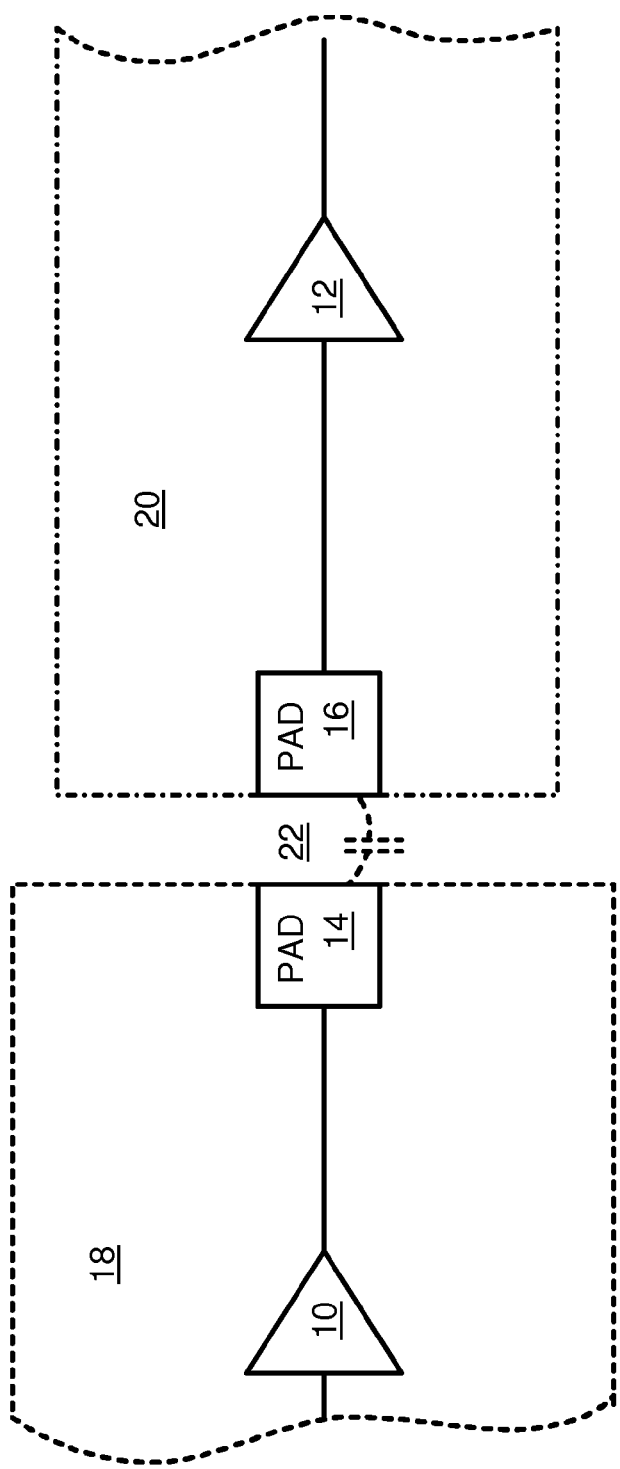
FIG. 1 shows a capacitive coupler interconnect.
Figure 2:
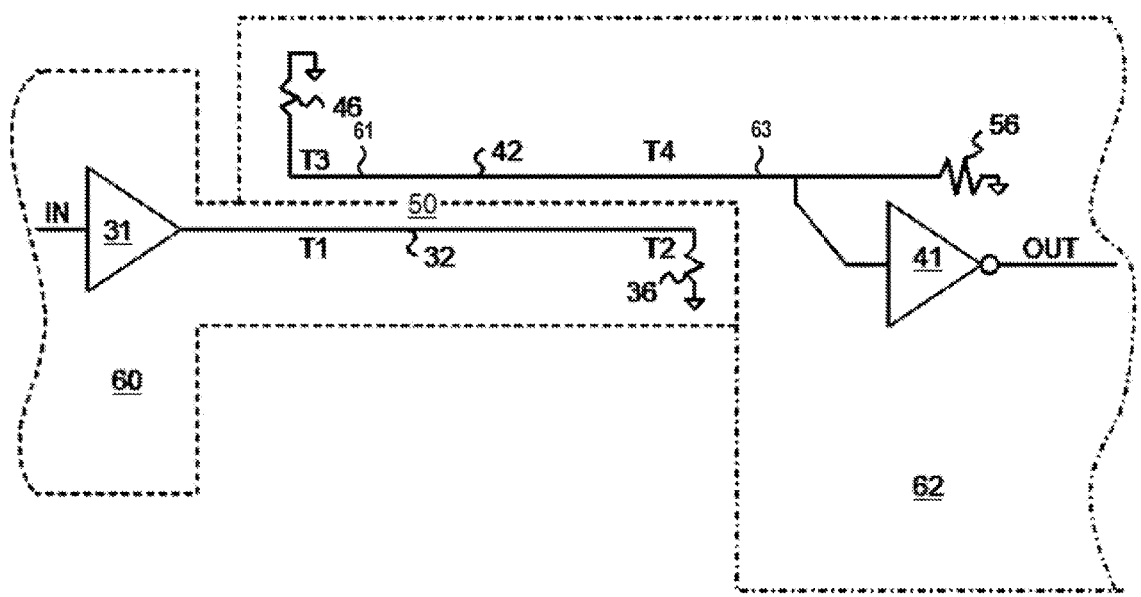
FIG. 2 is a schematic diagram of a contactless coupler using parallel transmission lines.

FIG. 2 is a schematic diagram of a contactless coupler using parallel transmission lines. PCB 60 has driver 31 that drives a pulse onto transmitting transmission line 32, which is terminated on its far end by resistor 36.

A portion of PCB 60 is overlapped by PCB 62 so that receiving transmission line 42 is positioned adjacent to transmitting transmission line 32, separated by gap 50 (e.g., an air gap) and any dielectric layers on the surfaces of PCB 60 and PCB 62. Receiving transmission line 42 is parallel to transmitting transmission line 32 so that point T1 on transmitting transmission line 32 lines up with point T3 on receiving transmission line 42 at a first end 61. Also, point T2 at the far end of transmitting transmission line 32 lines up with point T4 on receiving transmission line 42 at a second end 63.

Receiving transmission line 42 is terminated near point T3 by resistor 46, and is also terminated near the input to amplifier 41 by resistor 56. Thus receiving transmission line 42 is terminated at both ends 61 and 63, while transmitting transmission line 32 is terminated only at the far end.

An input signal IN is generated by other circuitry on PCB 60 and applied to driver 31. Driver 31 then generates a pulse for each pulse of IN (or for each edge of IN for some alternate modulation schemes). This pulse travels from the output of driver 31, past point T1, along transmitting transmission line 32, past point T2, and then is terminated and mostly dissipated by resistor 36.

When the pulse passes point T1, capacitive and inductive coupling occur to point T3 on receiving transmission line 42. The capacitive coupling is caused by electric attraction, while the inductive coupling is caused by magnetic effects created by the flow of charge and the mutual inductance of transmitting transmission line 32 and receiving transmission line 42. A smaller pulse is induced at point T3 on receiving transmission line 42 by the capacitive and inductive coupling effects. A capacitive coupler would take advantage of such effect.

Initially at point T3 the capacitive coupling effects are greater than the inductive effects but as the pulse continues to travel down transmitting transmission line 32 from point T1 to point T2, the inductive coupling effects become greater than the capacitive effects, assuming that the length of transmitting transmission line 32 is much greater than its width.

As the pulse on transmitting transmission line 32 travels from point T1 to point T2, another induced pulse travels from point T3 to point T4 on receiving transmission line 42. This induced pulse on receiving transmission line 42 is coincident with the driven pulse on transmitting transmission line 32. As current flows from point T1 to point T2 on transmitting transmission line 32, an image current flows in the opposite direction on receiving transmission line 42, from point T4 to point T3.

At point T3, this induced pulse on receiving transmission line 42 has the same polarity as the driven pulse on transmitting transmission line 32, but farther down the transmission lines, inductive coupling becomes greater. At point T4, the cumulative inductive effects overwhelm the capacitive inductive effects.

As the driven pulse passes point T2 on transmitting transmission line 32, the induced pulse at point T4 on receiving transmission line 42 has grown to its most negative value. The driven pulse has steadily been attenuated as it traveled along transmitting transmission line 32. Thus energy from the driven pulse on transmission line 32 has been transferred to the inducted pulse on transmission line 42.

The induced pulse then passes point T4 and continues on to the input of amplifier 41, where it generates a signal OUT that can be used by other circuitry on PCB 62. The induced pulse is terminated by resistor 56.

Impedance mismatches may allow some of the induced pulse to be reflected back from the input of amplifier 41 and resistor 56. These reflections are then terminated by resistor 46 at the other end of receiving transmission line 42. Likewise, impedance mismatches at resistor 36 may cause some of the driven pulse to be reflected backwards along transmitting transmission line 32.

Figure 3:
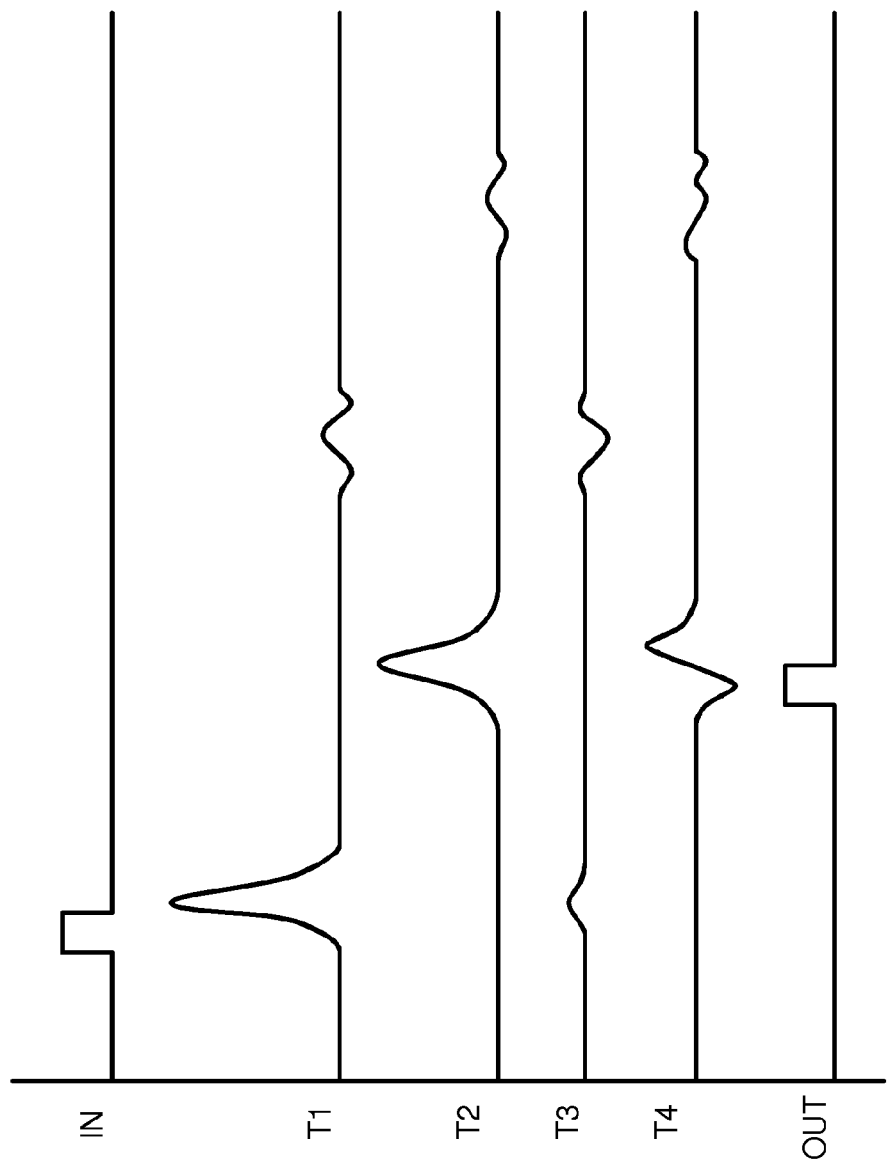
FIG. 3 is a waveform diagram of driven and induced pulses on the parallel transmission lines of FIG.

FIG. 3 is a waveform diagram of driven and induced pulses on the parallel transmission lines of FIG. 2. When input signal IN is high, the driver outputs current to the near end of transmitting transmission line 32. The voltage at point T1 rises quickly. When IN goes low, the driver stops outputting current, and the voltage at point T1 falls, ending the driven pulse.

As the driven pulse travels down transmitting transmission line 32 from point T1 to point T2, its amplitude is reduced as energy is coupled to receiving transmission line 42. Energy is also converted to heat by resistances along transmitting transmission line 32, or lost due to other parasitics. Thus the voltage of the driven pulse at point T2 is less than the voltage of the driven pulse at point T1.

Points T3 and T4 are on receiving transmission line 42. At point T3, when the driven pulse passes point T1, capacitive coupling induces a smaller pulse at point T3. This induced pulse at point T3 has the same (positive) polarity as the driven pulse at point T1 since capacitive effects are initially stronger than inductive effects.

However, as the driven pulse travels from point T1 to point T2, the inductive effects in transmission line 42 become stronger and are added to the relatively constant capacitive effects. Since the induced pulse due to inductive effects has an opposite polarity to the driven pulse and to the capacitively induced pulse, the induced pulse is positive at point T3, but then decreases and turns negative, growing more negative until point T4 is reached.

At point T4, the induced pulse is first negative, but then oscillates to positive. The negative amplitude of the induced pulse at point T4 is proportional to the rising edge rate of the drive pulse at point T1. The induced pulse swings positive in response to the driven pulse falling, since the positive amplitude of the induced pulse is proportional to the falling edge rate of the driven signal, and the end of the driven pulse.

The swing from a negative induced pulse to a positive induced pulse in transmission line 42 proximate T4 is caused by inductive coupling, since inductive coupling is caused by a change in flow of charge, which creates the magnetic field. In contrast, capacitive coupling does not first swing low than swing high—it produces a single induced pulse, such as shown initially for point T3.

The amplifier 41 (FIG. 2) detects this negative induced pulse and generates a pulse on OUT as shown in FIG. 3, which can be used by other circuitry on PCB 62. The amplifier also detects this negative pulse swinging positive, and uses this swing to end or terminate the OUT pulse.

On transmitting transmission line 32, a reflection occurs at the far end, near point T2, which is reflected back to point T1 and appears as small oscillations, first at point T1 and later at point T2 as the pulse is reflected again by the driver at the near end (shown in FIG. 2 towards the right of the waveforms for T1 and T2). Also, on receiving transmission line 42, a reflection occurs at the input to amplifier 41, which is reflected back to point T3, and then again reflected by mismatches at resistor 46 to point T4. These reflected oscillations are small with properly matched termination resistors. However, if termination resistors were not present, these reflections could be as large as the induced pulses, eventually causing false reception by amplifier 41. Thus the inventor has discovered the matched termination significantly improves noise margins.

Figure 4:
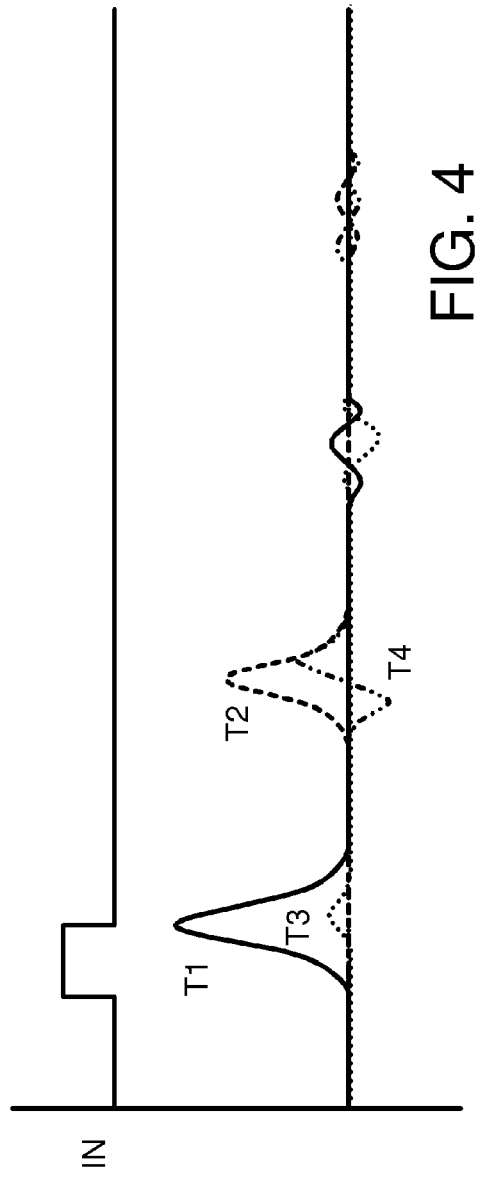
FIG. 4 shows the waveforms superimposed on each other.

FIG. 4 shows the waveforms superimposed on each other. The IN pulse high creates the rising pulse at point T1 (solid line), while the IN pulse going low ends the driven pulse at point T1. The induced pulse (dotted line) on the other transmission line at point T3 is much smaller, but positive, since it is created by capacitive coupling.

Later in time, when the driven pulse has traveled down transmitting transmission line 32, the driven pulse is attenuated at point T2 (dashed line). However, the induced pulse on receiving transmission line 42 at point T4 (dash-dotted line) is now dominated by magnetic induction, not capacitance. Inductance causes the induced pulse to first pulse low, in response to the rising edge of the driven pulse at T2, then pulse high, in response to the falling edge of the driven pulse at T2.

Later in time, reflections and oscillations occur due to termination mismatches with the characteristic impedances of transmitting transmission line 32 and receiving transmission line 42 and components attached to these lines. The oscillations from these reflections first are visible at points T1,T3, then at points T2, T4.

Figure 5:
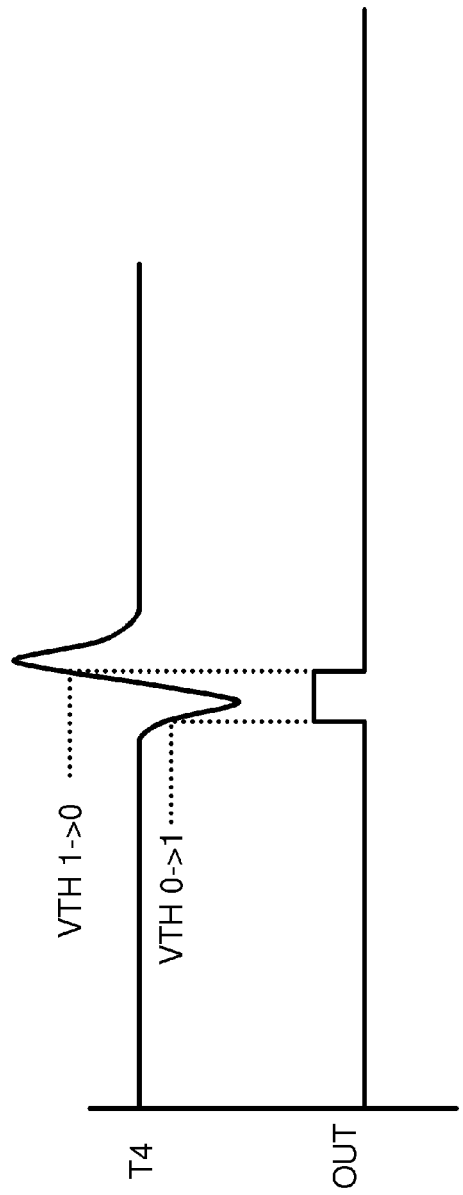
FIG. 5 is a waveform highlighting voltage threshold sensing on an induced pulse for sensing both negative and positive swings of the magnetically-induced pulse on the parallel transmission line.

FIG. 5 is a waveform highlighting voltage threshold sensing of an induced pulse that senses both negative and positive swings of the magnetically-induced pulse on the parallel transmission line. At point T4, the inductively-induced pulse on receiving transmission line 42 initially swings negative. When the negative voltage falls below threshold VT0->1, amplifier 41 drives OUT high.

As the edge rate of the driven pulse at T2 decreases near the peak of the driven pulse, the absolute amplitude of the induced pulse also decreases toward zero. The negative peak of the induced pulse at point T4 occurs at the maximum rising edge rate of the driven pulse at point T2.

Later in time, when the driven pulse at T2 has its falling edge, the induced pulse at point T4 turns positive and pulses high. When the positive voltage rises above threshold VT1->0, amplifier 41 drives OUT low. The positive peak of the induced pulse at point T4 occurs at the maximum falling edge rate of the driven pulse at point T2.

The thresholds of amplifier 41 do not have to be the same value. A Schmitt trigger detector or input buffer may be used for amplifier 41. The first threshold, VT0- >1, may be lower than the second threshold, VT- >0. The first threshold, VT0->1, may be negative, while the second threshold, VT1->0, is positive. This increases the pulse width of OUT, and reduces noise sensitivity.

The first threshold, VT0- >1, may be selected to be more negative than any of the negative oscillations of the reflections at point T4. Likewise, the second threshold, VT1->0, may be selected to be greater than any of the positive oscillations of the reflections at point T4. Then reflections do not falsely trigger the output OUT.

Figure 6:
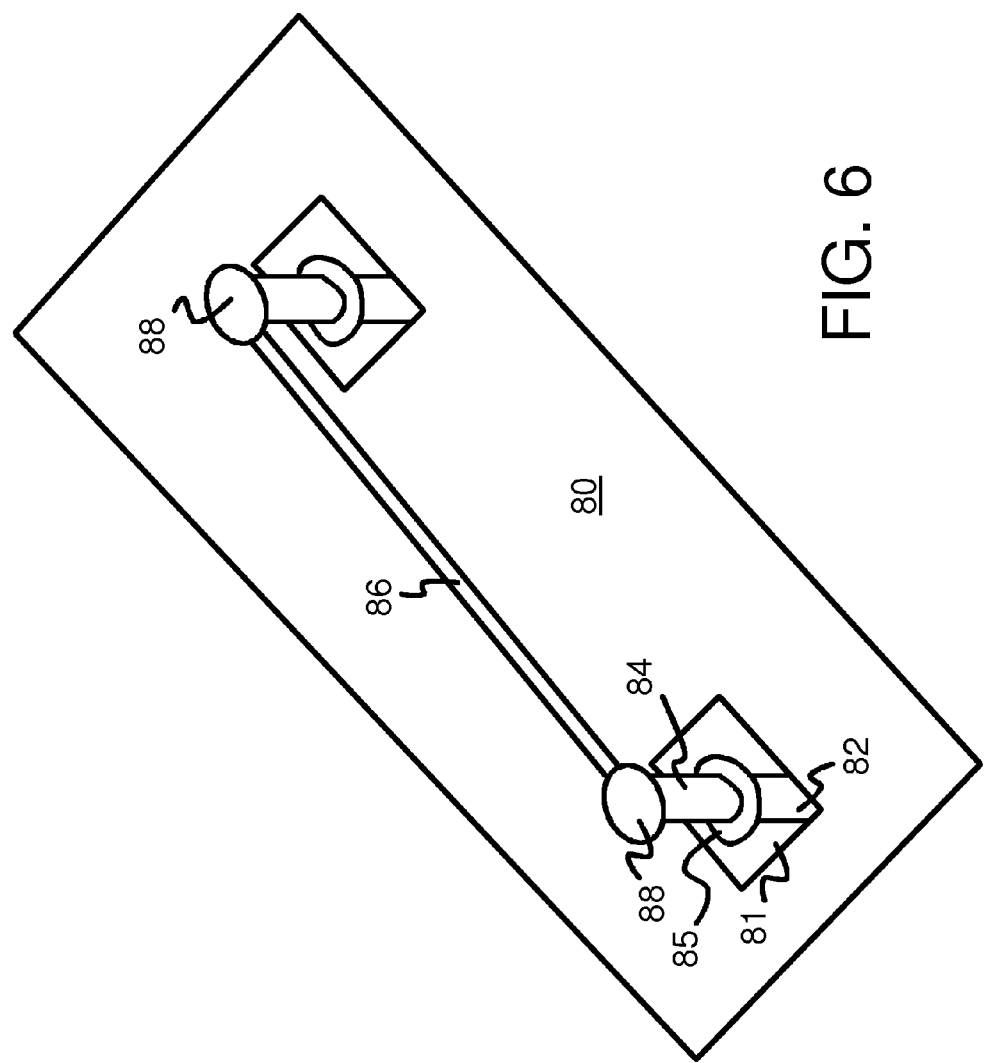
FIG. 6 is a perspective view of a parallel-transmission line coupler structure.

FIG. 6 is a perspective view of a parallel-transmission line coupler structure. Insulating layers are etched away to show only the conductive layers in PCB 60.

Metal trace 86 is a long conductive metal trace on a top metal layer. Metal trace 86 forms transmitting transmission line 32 or receiving transmission line 42. Pads 88 are larger metal areas at the ends of metal trace 86 and correspond to points T1, T2 for transmitting transmission line 32. Metal post 84 is formed within a via to connect to metal area 85 in the next metal layer, and then to metal post 82 that passes to another metal layer for connection to a driver or termination resistor.

Opening 81 in the second metal layer allows for electrical connection from metal trace 86 near the surface of the PCB to lower layers for connection to a driver or termination resistor. Metal plane 80 is formed in the second metal layer and is grounded. Thus metal plane 80 forms a ground plane that acts as a current return plane for metal trace 86.

Figure 7:
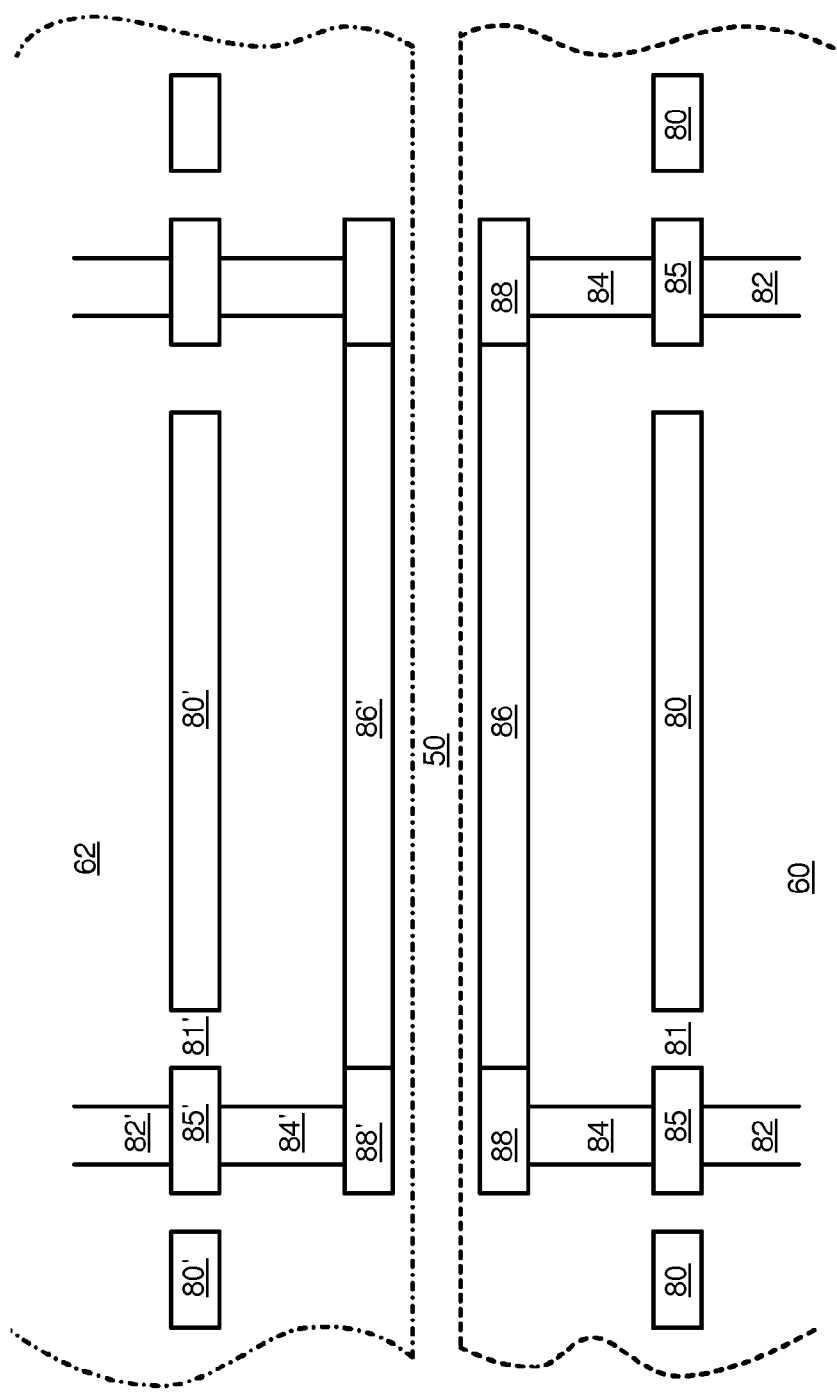
FIG. 7 is a cross sectional diagram showing two PCB's placed face-to-face to bring two parallel transmission lines in close proximity.

FIG. 7 is a cross sectional diagram showing two PCB's placed face-to-face to bring two parallel transmission lines in close proximity. Air gap 50 separates PCB 60 from PCB 62, which have their surfaces placed face-to-face. Metal trace 86 in PCB 60 acts as transmitting transmission line 32, while metal trace 86' in PCB 62 acts as receiving transmission line 42. Metal planes 80, 80' are grounded (not shown) to act as induced current return planes above and below the two transmission lines. Openings 81, 81' allow metal posts 82, 84, 82', 84' to pass through metal planes 80, 80' so that the termination resistors, drivers, and receivers shown in FIG. 2 may connect to the two ends of metal traces 86.

Figure 8:
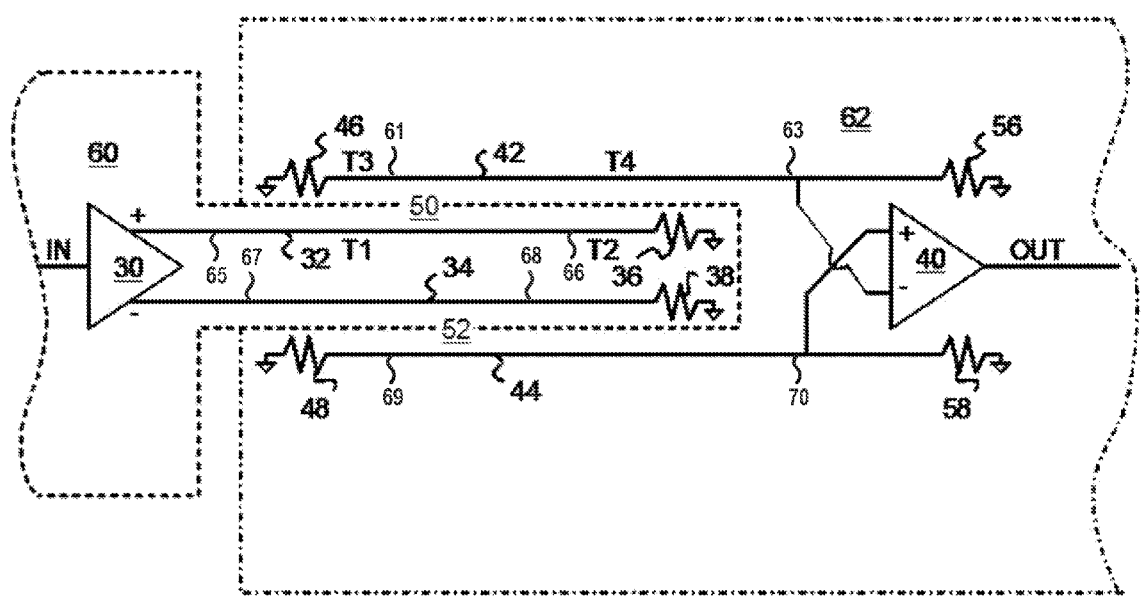
FIG. 8 shows a differential coupler using two pairs of parallel transmission lines.

FIG. 8 shows a differential coupler using two pairs of parallel transmission lines. Input signal IN is applied to differential driver 30, which has a true output connected at a first end 65 of transmitting transmission line 65, opposite a second end 66, and driving transmitting transmission line 32, and a complement output connected at a first end 67 of transmission line 34 and opposite a second end 68, and driving transmitting transmission line 34. When IN is high, differential driver 30 drives a high driven pulse onto trans-mitting transmission line 32 and a low driven pulse onto transmitting transmission line 34. the differential pulses travel down transmitting transmission lines 32, 34 together, but with opposite polarities, and are terminated by resistors 36, 38.

PCB 60 with transmitting transmission lines 32, 34 has a surface that fits closely over or under a surface of PCB 62. Transmitting transmission lines 32, 34 could be on the same surface of PCB 60, while receiving transmission lines 42, 44 are on a surface of PCB 62 that is placed face-to-face over the surface of PCB 60. PCB 60 and PCB 62 are designed so that receiving transmission line 42 is parallel to transmitting transmission line 32, with air gap 50 in between, and so that receiving transmission line 44 is parallel to transmitting transmission line 34, with air gap 52 in between. Air gaps 52, 50 can be the same air gap, but at different locations between the surfaces of PCB 60 and PCB 62.

On receiving PCB 62, differential receiver 40 has an inverting − input that is connected opposite a first end 61 of receiving transmission line 42 at a second end 63 near terminating resistor 56, near point T4. Differential receiver 40 also has a non-inverting +input that is connected opposite a first end 69 of receiving transmission line 44 at a second end 70 near terminating resistor 58. Differential receiver 40 compares the voltages of its inverting and non-inverting inputs and generates its output OUT in response to the voltage difference.

The inverting and non-inverting inputs of differential receiver 40 are crossed-over since inductive effects on the parallel transmission lines invert the polarities of the driven pulses on transmitting transmission lines 32, 34 to generate the induced pulses on receiving transmission lines 42, 44.

Receiving transmission line 42 is terminated by resistor 46 near point T3 and by resistor 56 near point T4. Likewise, receiving transmission line 44 is terminated by resistor 48 at one end and by resistor 58 at the other end near differential receiver 40.

The driven pulse on transmitting transmission line 32 and the induced pulse on receiving transmission line 42 are the same as shown in FIGS. 2-4. However, the driven pulse on transmitting transmission line 34 and the induced pulse on receiving transmission line 44 have an opposite polarity to that shown in FIGS. 2-4 since these are of the opposite differential polarity.

A Schmitt trigger may be included with differential receiver 40 so that the thresholds may be adjusted for both low-going and high-going induced pulses.

Figure 9:
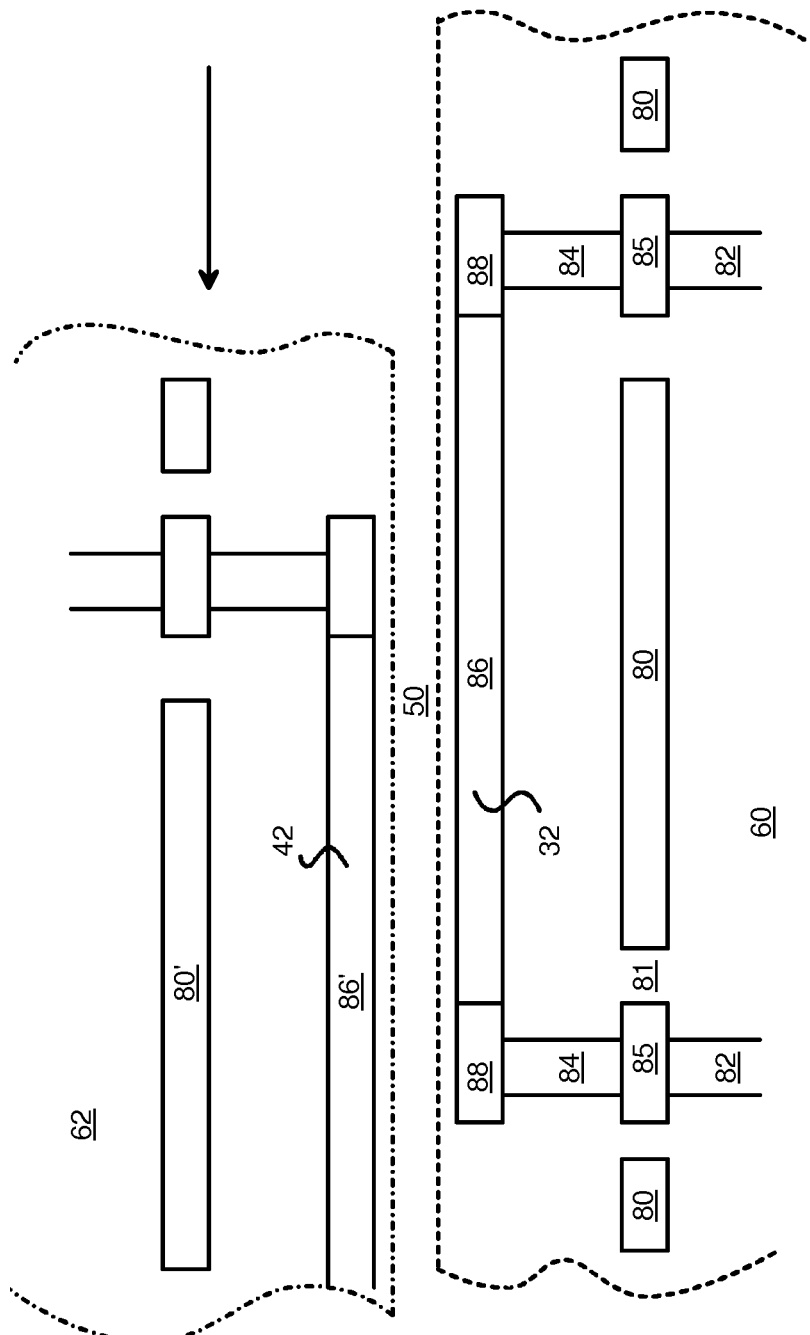
FIG. 9 shows removal of PCB 62 from PCB 60.

FIG. 9 shows removal of PCB 62 from PCB 60. PCB 62 may slide in and out of proximity with PCB 60, so that transmitting transmission line 32 slides along the length of receiving transmission line 42. Thus when PCB 62 is inserted into a chassis to make inductive contact with PCB 60, the direction of insertion may be parallel to the length of transmitting transmission line 32 and receiving transmission line 42.

When PCB 62 is inserted in this manner, a better alignment of transmitting transmission line 32 and receiving transmission line 42 may result since the alignment in the direction perpendicular to the length of transmitting transmission line 32 is achieved by a card guide in a precise manner, while the alignment in the direction along the length of transmitting transmission line 32 may be less exact, since PCB 62 may be pushed in with varying amounts of pressure, and come to a stop with less accuracy. However, since the length of transmitting transmission line 32 is relatively long, the small difference in overlap with receiving transmission line 42 at their ends results in a negligible difference in mutual inductance. A similar amount of mis-alignment in the direction perpendicular to the length of transmitting transmission line 32 would produce a large difference in mutual inductance, since it would change the distance between transmitting transmission line 32 and receiving transmission line 42 over the entire length of the transmission lines.

During the sliding motion of insertion and removal, transmitting transmission line 32 and receiving transmission line 42 remain coupled together as long as there is some overlap, although with declining mutual inductance as PCB 62 is pulled out from PCB 60. Thus the board being removed may continue to be connected during removal, which may be beneficial in certain applications.

Alternate Embodiments

Several other embodiments are contemplated by the inventor. For example additional transmission lines, drivers, and receiving could be added for additional signals. The direction of some additional transmission lines, drivers, and receivers could be reversed to allow for data flow in the opposite direction, allowing bi-directional communication, but on different pairs of transmission lines.

While resistors to ground have been shown for termination, resistors to a different fixed voltage, such as power or Vcc/2, could be substituted. A series AC capacitor could be added on the input of the receiver to allow pulses go through. The input of the receiver past the series capacitor could be biased to VCC/2, or another internal bias voltage. Positive and negative meanings may be relative to the steady state level rather than to a ground or to Vcc/2.

The value of the termination resistors could be adjusted such as by using external resistors or mask options. More complex termination may be substituted, such as networks of resistors. In particular, an additional equalizing resistor may be added between resistors 36, 38, and another between resistors 46, 48 in FIG. 8 (and between resistors 56, 58) to provide equalization termination between the differential lines. Capacitors, inductors, or other components could also be used in the termination networks to match impedances of transmission lines.

Near-end termination could be added at the output of driver 31, such as a series termination. This series termination may be added to match the characteristic impedance of the transmission line. Resistor 56 may be deleted in some embodiments.

The trace geometry can be of various shapes, such as diamond shapes, or a serpentine trace, or winding, as opposed to a straight one. However, the sliding benefit may be lost with these geometries. Special materials, and geometries for these materials, may be employed to enhance the performance of the coupler. Ferromagnetic material around the transmission-line trace may boost the inductive coupling and reduce the trace length.

Various encodings of the IN and OUT signals and the driven pulses may be used, such as NRZI, Pulse-Amplitude Modulation (PAM), with additional threshold levels are at the receiver, Pulse-Slew-Rate Modulation (PSRM) might be implemented by varying the slew rate of the driver. The driver may transmit two kind of pulses, one with a slow slew rate, one with a fast slew rate, both with the same amplitude. A slow slew-rate would result in a low amplitude at the receiver, while a fast slew rate would result in a high amplitude at the receiver. The receiver would then have four thresholds.

Information may be transmitted by the length of pulses, delay between pulses, number of pulses, absence or presence of pulses, etc. The pulses may be part of larger data structures such as symbols that may include headers, framing bits or sequences, packets of data, etc. Negative or positive logic may be used. Additional buffers, logic, gating, and other components may be added. For example, the inputs of differential receiver 40 may not be crossed over as shown in FIG. 8 when the inverse of OUT (OUT-BAR) is needed by downstream logic.

While FIGS. 2, 8 have shown PCB 60 and PCB 62, other kinds of boards or substrates could be substituted, such as sapphire substrates, silicon substrates, glass substrates, ceramic substrates, organic substrates, etc. PCB 60 and/or PCB 62 could be replaced by an integrated circuit, or one could be a smaller daughter card or a larger backplane board. PCB 60 and PCB 62 do not have to be the same size or geometry, other than having an overlap region. Additionally, substrates are known to be used within various semiconductor packages.

Having a protection layer above metal traces 86 that form the transmission lines is beneficial since metal is not exposed to air, reducing corrosion and wear due to the sealed structure. Mechanical stress is also reduced using contactless connectors since the boards do not have to make contact with each other, although some contact may occur during insertion or removal.

While the transmission line of metal trace 86 (FIG. 6) could be exposed to air, it may also be protected by a dielectric layer, such as a solder mask polyimide film. In one embodiment, three films of 2 mil each cover the copper layer of metal trace 86. The air gap can be 0.1 mm. Metal trace 86 may be 5 mils wide and 5 cm long, for a length-to-width ratio of about 400. Other ratios such as 10, 100, or 1000 may be substituted. The spacing to the ground plane is 20 mil. Ideally, the transmission line traces should be closer to each other than to the ground planes.

The magnitude of the frequency response of the coupling structure is flat over a very wide frequency range, which is well suited for traditional simple 8B10B or similar line-encoding schemes. The lower frequency is limited by the capacitive properties of the coupled structure, while the higher frequency is limited by the material properties and associated losses. The inductive transmission line coupler may act electrically as a high-pass coupler, similar to a lossy capacitor. High data rates are maintained since the time delay between transitions and pulses are maintained between the driven pulses and the induced pulses. Thus distortion of the transmitted signals is minimized, allowing for very high frequency operation. Symbol interference is reduced. A simple linear structure may be used for transmitting transmission line 32 and for receiving transmission line 42, reducing distortions such as reflections off of bends and junctions in metal traces. The length of transmitting transmission line 32 may be 100 or 1000 times its width. The linear segment between the first and second ends of the transmission line may be at least 90% of the entire length between the transmitter or receiver and the terminator to increase the effect of the mutual inductance and enlarge the induced pulse.

While sliding along a line has been described when mating the two transmission lines during board insertion, rotation or angular sliding may be used in some embodiments. An additional ground plane may be added between the transmission-line traces. This additional ground plane may have holes to distort the electromagnetic field. This may boost the coupling effect by taking advantage of the pull-through effect of a hole in a plane to the electro-magnetic fields.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. An interconnect comprising:
a first substrate having wiring traces including a transmitting transmission line formed by one of the wiring traces of the first substrate;
a second substrate having wiring traces including a receiving transmission line formed by one of the wiring traces of the second substrate;
a driver on the first substrate for driving a driven pulse onto the transmitting transmission line, the driver comprising a differential driver having a true output that drives a first end of the transmitting transmission line and a complementary output, wherein the true output and the complementary output are driven to opposite polarities;
a receiver on the second substrate for sensing an induced pulse on the receiving transmission line;
wherein a portion of the transmitting transmission line is overlapping with and substantially parallel to the receiving transmission line, wherein an induced pulse, sensed by said receiver, is generated by mutual inductance that induces an induced current in the receiving transmission line,
a complementary transmitting transmission line having a first end connected to the complementary output of the driver and having a second end after a first complementary linear segment;
a complementary receiving transmission line having a first end and a second end after a second complementary linear segment; and
wherein the first complementary linear segment is overlapping with and parallel to the second complementary linear segment, wherein a complementary induced pulse is generated by mutual inductance from a change in current in the complementary transmitting transmission line that creates a magnetic field that induces a complementary induced current in the complementary receiving transmission line;
wherein the receiver is a differential receiver having a first input connected to the second end of the receiving transmission line, and having a second input connected to the second end of the complementary receiving transmission line.

2. The interconnect of claim 1 wherein the receiving transmission line comprises a first end and a second end, and wherein the induced pulse at the second end of the receiving transmission line has a substantially greater amplitude than an amplitude of a capacitively-induced pulse between the transmitting transmission line and the receiving transmission line,
wherein a geometry of the receiving transmission line causes magnetic field induction to be greater than electric field induction at the second end of the receiving transmission line.

3. The interconnect of claim 2 wherein a geometry of the receiving transmission line causes the induced pulse at the second end of the receiving transmission line to have an initial polarity opposite to a polarity of the driven pulse, and caused by a first edge of the driven pulse, and causes the induced pulse at the second end to have a subsequent polarity that has a same sign as the polarity of the driven pulse, the subsequent polarity caused by a second edge of the driven pulse,
wherein the induced pulse swings between two polarities while the driven pulse has a single polarity.

4. The interconnect of claim 2 wherein the receiver is a Schmitt trigger receiver having a rising input threshold for a rising edge of the induced pulse on the receiving transmission line that is different from a falling input threshold for a falling edge of the induced pulse on the receiving transmission line.

5. The interconnect of claim 4 further comprising:
a first terminator at the first end of the receiving transmission line.

6. The interconnect of claim 5 further comprising:
a second terminator at the second end of the receiving transmission line;
whereby the receiving transmission line is terminated at both ends.

7. The interconnect of claim 6 wherein the first terminator is a resistor connected between the first end of the transmitting transmission line and a reference voltage;
wherein the second terminator is a resistor connected between the second end of the receiving transmission line and the reference;
wherein the first terminator is a resistor connected between the first end of the receiving transmission line and the reference.

8. The interconnect of claim 6 wherein the first substrate is parallel to the second substrate, and separated by an air gap;
wherein the transmitting transmission line is not in physical contact with the receiving transmission line but is separated by the air gap.

9. The interconnect of claim 8 wherein the first substrate is a first printed-circuit board (PCB) having the driver and other circuits mounted thereon;

wherein the second substrate is a second printed-circuit board (PCB) having the receiver and other circuits mounted thereon.

10. The interconnect of claim 9 further comprising:

a first ground plane formed in the first substrate below a first linear segment of the transmitting transmission line, wherein the first linear segment is between the first ground plane and a first surface of the first PCB;

a second ground plane formed in the second substrate above a second linear segment of the transmitting transmission line, wherein the second linear segment is between the second ground plane and a second surface of the first PCB;

wherein the first ground plane and the second ground plane are grounded.

11. The interconnect of claim 8 further comprising:

an intermediate ground plane formed between a first linear segment of the transmitting transmission line and a second linear segment of the transmitting transmission line;

holes formed in the intermediate ground plane, the holes for distorting an electromagnetic field between the transmitting transmission line and the receiving transmission line.

12. The interconnect of claim 1 further comprising:

a first complementary terminator at the second end of the complementary transmitting transmission line, for matching a characteristic impedance of the complementary transmitting transmission line;

a second complementary terminator at the second end of the complementary receiving transmission line;

a third complementary terminator at the first end of the complementary receiving transmission line.

13. The interconnect of claim 12 wherein the first input of the receiver is an inverting input and the second input of the receiver is a non-inverting input;

wherein the output of the receiver has a same polarity as an input of the driver, wherein the true output of the driver is a non-inverting output.

* * * * *